US010812831B2

(12) United States Patent
Chao (10) Patent No.: US 10,812,831 B2
(45) Date of Patent: Oct. 20, 2020

(54) VIDEO STREAM DELIVERY VIA ADAPTIVE QUALITY ENHANCEMENT USING ERROR CORRECTION MODELS

(71) Applicant: Piksel, Inc., Wilmington, DE (US)

(72) Inventor: Gerald CheShun Chao, Los Angeles, CA (US)

(73) Assignee: Piksel, Inc., Wilmington, DE (US)

( * ) Notice: Subject to any disclaimer, the term of this patent is extended or adjusted under 35 U.S.C. 154(b) by 164 days.

(21) Appl. No.: 15/764,277

(22) PCT Filed: Sep. 30, 2016

(86) PCT No.: PCT/EP2016/073516
§ 371 (c)(1),
(2) Date: Mar. 28, 2018

(87) PCT Pub. No.: WO2017/055609
PCT Pub. Date: Apr. 6, 2017

(65) Prior Publication Data
US 2018/0288440 A1    Oct. 4, 2018

Related U.S. Application Data

(60) Provisional application No. 62/234,972, filed on Sep. 30, 2015.

(51) Int. Cl.
*H04N 19/65*    (2014.01)
*H04N 19/59*    (2014.01)
(Continued)

(52) U.S. Cl.
CPC .............. *H04N 19/65* (2014.11); *G06T 9/001* (2013.01); *G06T 9/002* (2013.01); *H04N 19/112* (2014.11);
(Continued)

(58) Field of Classification Search
None
See application file for complete search history.

(56) References Cited

U.S. PATENT DOCUMENTS

| 10,027,888 | B1* | 7/2018 | Mackraz | G06K 9/00228 |
| 2007/0091997 | A1* | 4/2007 | Fogg | H04N 19/577 |
| | | | | 375/240.1 |
| 2010/0262472 | A1* | 10/2010 | Gautam | G06Q 30/02 |
| | | | | 705/14.1 |

FOREIGN PATENT DOCUMENTS

WO    2008/133951 A2    11/2008

OTHER PUBLICATIONS

Dong et al., "Learning a Deep Convolutional Network for Image Super-Resolution", Network and Parallel Computing, Sep. 6, 2014. (Year: 2014).*

(Continued)

*Primary Examiner* — William C Vaughn, Jr.
*Assistant Examiner* — Joseph Daniel A Towe
(74) *Attorney, Agent, or Firm* — Holzer Patel Drennan (57) ABSTRACT

There is disclosed a technique for providing multimedia content comprising: compressing a multimedia stream; and generating an error correction model for providing an alternative version of the compressed multimedia stream by: decompressing the compressed multimedia stream; determining errors in the decompressed version by comparing to the input multimedia stream; and correcting the errors to minimise the difference between the decompressed version and the input multimedia stream.

18 Claims, 3 Drawing Sheets

(51) Int. Cl.
*H04N 19/33* (2014.01)
*H04N 19/156* (2014.01)
*G06T 9/00* (2006.01)
*H04N 19/132* (2014.01)
*H04N 19/112* (2014.01)
*G06K 9/00* (2006.01)
*G06K 9/32* (2006.01)

(52) U.S. Cl.
CPC ......... *H04N 19/132* (2014.11); *H04N 19/156* (2014.11); *H04N 19/33* (2014.11); *H04N 19/59* (2014.11); *G06K 9/00744* (2013.01); *G06K 9/3233* (2013.01)

(56) References Cited

OTHER PUBLICATIONS

Zuo et al., "Content-adaptive Resolution Enhancement of Compressed Video with Encoder-Generated Side Information", Consumer Electronics, IEEE 2008, Jan. 9, 2008. (Year: 2008).*
Fei Zuo, et al., "Content-adaptive Resolution Enhancement of Compressed Video with Encoder-Generated Side Information", Consumer Electronics, IEEE 2008, Jan. 9, 2008.
Dong Chao, et al., "Learning a Deep Convolutional Network for Image Super-Resolution", Network and Parallel Computing, Sep. 6, 2014.
Norman Tasfi, "Image Scaling Using Deep Convolutional Neural Networks", Flip Board Engineering, URL:http://engineering.flipboard.com/2015/05/scaling-convnets, Jun. 5, 2015.
International Search Report and Written Opinion, European Patent Office, dated Nov. 21, 2016.

* cited by examiner

VIDEO STREAM DELIVERY VIA ADAPTIVE QUALITY ENHANCEMENT USING ERROR CORRECTION MODELS

FIELD OF THE INVENTION

The present invention relates to the delivery of multimedia streams, and more specifically, an efficient and robust method to deliver video streams whose quality is adaptive to the playback device.

BACKGROUND

With the increasing demand in video content delivered via the internet to a varieties of devices, including TVs, set-top boxes, tablets, and mobile phones, a trade off exists for the amount of resources needed to transfer the video data with the visual quality degradation introduced when compressing the video. One common approach is to create multiple versions of the same source video, by varying the compression level and reducing the video resolution to match the target device's screens. Another approach is to set the compression level by compensating for the available bandwidth between the servers and the target device, and selecting and switching between the least compressed version of the video that could be delivered within the available bandwidth.

However, existing approaches increase the resources needed for providing such a video service, both in terms of the computational cost of compressing the videos into multiple versions, as well as storing them for subsequent delivery. Additionally, the clients receiving the videos may be using more bandwidth than necessary, or suffering from poor image quality when the bandwidth is constrained. This problem is especially acute when the client device is a mobile device with limited bandwidth or computational power, or sometimes both.

One approach to mitigate these constraints is to transfer the video files to the clients' premises when bandwidth is not constrained, such as a set-top box or media server, and make the videos available to the clients' local networks where the bandwidth is usually not the limiting factor. While this approach reduces the server-to-client bandwidth bottleneck, it creates the challenge of which client device to target for visual quality. That is, should the videos be downloaded at the highest quality for the largest display device, and re-encoded for the smallest mobile devices when needed, but at the expense of large download and computation cost to re-encode? Or should the videos be downloaded at the median quality across the devices to save downloading time and avoid re-encoding, but at the expense of visual quality for the larger devices? Or should multiple versions be downloaded for different device sizes to maximize visual quality, but at the expense of large amounts of redundancy?

The need exists, therefore, for an improved method whereby each video only needs to be compressed once at a level with a modest bandwidth requirement, to serve as the "baseline" video quality across most devices. Then depending on the device's capabilities and context, such as screen size, additional bandwidth, computational power, and even battery levels, the quality of the video can be improved during playback dynamically. In doing so, the resources required both on the server and client side can be reduced, while the image quality maximized based on the available resources at time of the playback.

Various prior art arrangements are discussed in the following U.S. prior art documents.

U.S. Pat. No. 5,928,330—describes a method for changing the bit-rate of multimedia delivery to account for changes in network bandwidth. This requires the input multimedia files to be first encoded at multiple streaming rates in order for the server to provide this variable streaming capability to its clients.

U.S. Pat. No. 6,345,279—pre-generates many combinations of renderings on the server for various display conditions for a given multimedia item. This requires many permutations of renderings to be computed and is thus costly to generate to store, as well as to transfer to the clients.

U.S. Pat. No. 6,542,546—requires the same video to be transcoded on the server-side into multiple versions to support varying client conditions. This results in heavy server-side resources to transcode each video into multiple formats, both in terms of computational and bandwidth requirements.

U.S. Pat. No. 6,594,699—involves client-side determination of parameters for video playback, and server-side converting the source video to accommodate each client's playback requirements. This results in heavy server-side processing to convert each request, which is very resource intensive with large number of clients.

U.S. Pat. No. 7,133,925—provides multiple versions of multimedia files adapted to the receiving device. This requires heavy server-side processing to convert each input file into many versions.

U.S. Pat. No. 7,543,326—adjusts the bit-rate of streams by monitoring data windows and reducing data rate if needed to stay under the target bit rate. This is useful for guaranteeing maximum bit rates of a stream, but at the expense of degrading image quality regardless of the clients' resource availability, i.e., not adaptive.

U.S. Pat. No. 8,078,745—focuses on the transmission of the video data over the network and not addressing the client device's playback quality.

U.S. Pat. No. 8,145,779—describes a method for on-demand transcoding and caching on the server side for each client capabilities. This creates multiple copies per video, thus having high processing and storage requirements.

U.S. Pat. No. 8,190,674—describes a method for dynamic switching between different bit-rate versions of each video based on the network condition between the server and client. This requires each video to be encoded into multiple versions with different bit-rates, thus increasing computation requirements and duplication on the server-side for processing and storing the multiple versions.

U.S. Pat. No. 8,370,520—describes a method for a server to manage video serving capacity by varying bit-rates of the videos to its clients. This requires each video to be encoded into multiple bit-rates in order to dynamically switch between them, meaning that there's heavy resource requirement on the server side to encode and store the multiple versions, as well the bandwidth to deliver them.

U.S. Pat. No. 8,631,451—describes a method for on-demanding transcoding on the server side based on client capabilities. This requires heavy server-side processing to accommodate each client, which can be highly heterogeneous and therefore would need server-side processing per stream in the worse case.

U.S. Pat. No. 8,868,678—describes a method for on-demand transcoding and caching on the server side for each client capabilities, as well as user preferences. This creates many copies per video, thus creating high processing and storage requirements.

U.S. Pat. No. 8,904,027—describes the use of historical bandwidth per client to estimate which bit-rate version of a video for subsequent delivery. This assumes each video is encoded into multiple bit-rates in order for the server to choose the version to deliver to each client, thus creating the need for multiple copies per video and the associated computational, storage, and bandwidth costs.

NON-PATENT CITATIONS http://engineering.flipboard.com/2015/05/scaling-convnets/—describes a method for converting lower resolution images to higher resolution version using machine learning models, but does not apply it towards improving video delivery.

http://arxiv.org/abs/1501.00092—"Image Super-Resolution Using Deep Convolutional Networks"—describes a method for converting lower resolution images to higher resolution version using machine learning models, but does not apply it towards improving video delivery.

http://mmlab.ie.cuhk.edu.hk/projects/SRCNN.html describes a method for converting lower resolution images to higher resolution version using machine learning models, but does not apply it towards improving video delivery.

SUMMARY OF THE INVENTION

The present invention is centered around the observation that higher resolution and higher image quality video can be reconstructed from a compressed version via an error-correction model, which is trained on reducing the errors introduced during the compression process. Specifically, preferably the present invention first generates a compressed baseline video that qualifies as the minimal acceptable playback quality on the least capable device. The present invention then creates one or more error-correcting models per video that may be selectively used at playback time and that adapts to the playback context by maximizing the image quality while compensating for any resource constraints. The end result is a video delivery method that is more efficient by reducing storage, bandwidth and duplication on the server side, while improving the image quality during playback and reducing bandwidth and computational resources on the client side.

While the approach of improving image quality from lower quality versions via machine learning models is known, usually called super-resolution for those familiar in the art, the combination of dynamically choosing the best error-correction model for video playback that maximizes the client's context is. Furthermore, by training these error-correction models per video or a collection of similar videos, the present invention reduces their complexity and training time when compared to generalized super-resolution models intended to process all possible images and therefore a daunting task, while at the same time improving the accuracy of the image reconstruction process, i.e., better image quality.

In one aspect the invention provides a method of providing multimedia content comprising: compressing a multimedia stream; and generating an error correction model for providing an alternative version of the compressed multimedia stream by: decompressing the compressed multimedia stream; determining errors in the decompressed version by comparing to the input multimedia stream; and correcting the errors to minimise the difference between the decompressed version and the input multimedia stream.

The multimedia stream is compressed to a first resolution and the alternative version is of a second resolution.

The step of determining errors in the alternative version comprises: applying a correction to the decompressed version; comparing the corrected version to the input multimedia stream for differences; refining the parameters of the error correction model to reduce the differences; and iteratively repeating the applying, comparing and refining steps in order to minimise the errors, wherein the error correction model is based on the final iteration.

The method may further comprise correcting the decompressed version to minimise the difference between the corrected version and input multimedia stream.

Comparing the corrected version to the input multimedia stream further comprises one or more of: adjusting weighting of differences based on position of the pixels within the image; adjusting weighting of differences based on regions of interest of the input; and adjusting weighting of differences based on motion data generated during the compression process of the multimedia stream.

Identifying regions of interest may further comprise one or more of: identifying objects within input images via image analysis as regions of interest; computing heatmaps within input images via gaze analysis as regions of interest; and estimating high motion regions between input frames as regions of interest.

The error correction model may comprise a plurality of adjustment parameters for adjusting the scaling of the compressed version, wherein there is provided a plurality of error correction models each having a different number of adjustment parameters. There may be provided a plurality of error correction models each having a different number of parameters for each of at least one resolution.

The method may further comprise storing the compressed version and the error correction model.

The method may further comprise receiving a request for an error correction model identifying a characteristic of a playback device, and returning the error correction model most closely associated with characteristic. The characteristic is a resolution or a resource characteristic.

In a further aspect the invention provides a method of playing multimedia content, comprising: retrieving a compressed version of a multimedia stream; retrieving an error correction model in dependence on a characteristic of a playback device; applying the retrieved error correction model to a decompressed version of the compressed version; and delivering the corrected version to a display.

The characteristic is a resource characteristic.

The characteristic is a maximum bandwidth available on the playback device; a computational capability of the playback device; available storage on the playback device; a battery level of the playback device.

The method may further comprise retrieving a further error correction model responsive to a change in a resource of the playback device.

The characteristic is a resolution of a display associated with the playback device.

The method may further comprise determining a resolution of a display associated with the playback, and retrieving an error correction model being associated with a resolution most closely matching the display resolution.

In a further aspect the invention provides a server for providing multimedia content comprising: a compressor for compressing a multimedia stream; and an error correction generator for generating an error correction model for providing an alternative version of the compressed multimedia, the error correction generator being configured to: decompress the compressed multimedia stream; determine errors in the decompressed version by comparing to the input multimedia stream; and correct the errors to minimise the difference between the decompressed version and the input multimedia stream.

In another aspect the invention provides a device for multimedia content, comprising: a receiver for retrieving a compressed version of a multimedia stream; a receiver for retrieving an error correction model in dependence on a characteristic of a playback device; a correction device for applying the retrieved error correction model to a decompressed version of the compressed version; and a playback device for delivering the corrected version to a display.

DETAILED DESCRIPTION

Figure 1:
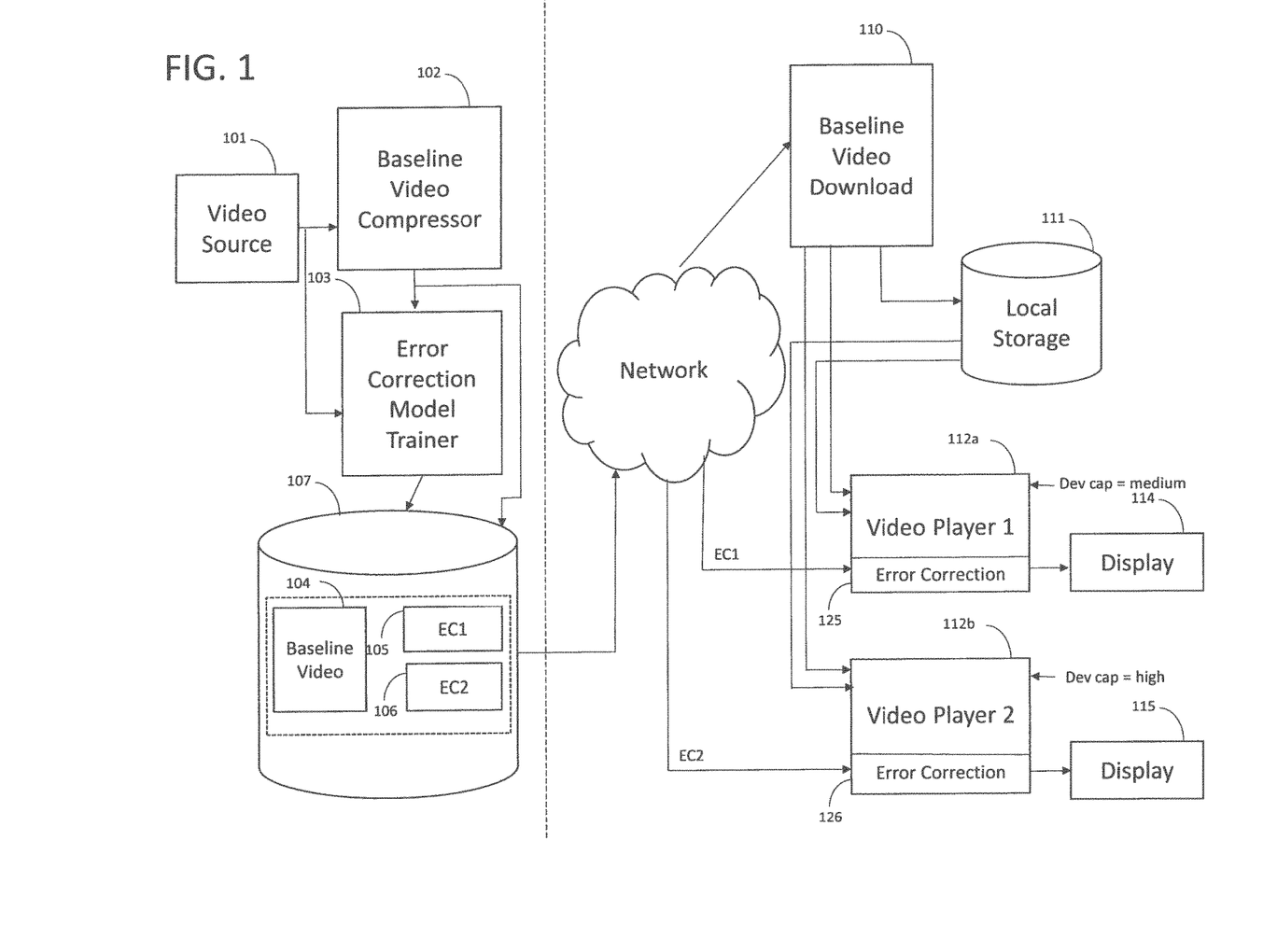
FIG. 1 illustrates in schematic form the manner in which videos are processed and played back in accordance with an example according to the invention.

FIG. 1 illustrates in schematic form the manner in which information is processed in accordance with an example according to the invention. As will be described in more detail below, some of the structures and functions illustrated in FIG. 1 represent optional functionality that need not be present in all implementations of the invention.

Source videos in their "master" format enter the system from a video source denoted by reference numeral 101.

The source videos are first compressed by a compressor using a baseline compression profile denoted by reference numeral 102 into "baseline" videos. A video datastore denoted by reference numeral 107 includes a baseline video store denoted by reference numeral 104, to which the baseline videos from the baseline video compressor 102 are stored.

The baseline video compressor 102 uses industry-standard video compression codecs with the parameters chosen to target the "baseline" playback experience as determined by the implementer. For example, one possible target would be 720 vertical pixels (a.k.a. 720p) at 1.5 megabits per second (a.k.a. 1.5 mbps), which would play reasonably well for mobile devices with 5 inches or smaller displays. One can also target even lower resolution and bandwidth to maximize savings in storage and bandwidth, but at the expense of image quality when played on larger devices. Conversely, one would target higher resolution and bandwidth if the transfer time and storage are less of a constraint, with the benefit of improved image quality.

In an example, the source video is compressed to a particular resolution. For example, the "master" video may be compressed to a resolution of 480p and at a ratio to not exceed a data rate of 1.2 mbps. The baseline video is then 480p at 1.2 mbps.

The compressed video from the baseline video compressor 102, along with the original "master" video from the video source 101, are sent to an error correction model trainer module denoted by reference numeral 103. This module 103 pairs the decompressed image frames from the compressed video with the image frames from the original video to calculate the pixel differences as errors introduced during the compression process. This difference is calculated for one or more resolutions. Minimizing the overall error is the objective of this trainer module 103, by adjusting its internal parameters such that the error-corrected version of the decompressed image frames from the compressed video have as little pixel differences to the original image frames from the "master" video.

This module 103 is described in more detail below. In general an error correction model may be generated for a desired resolution. In the example the baseline video has a resolution of 480p. This baseline video can be upscaled to a resolution of 720p, and then the errors between the upscaled 720p resolution version and the original master video determined. The task of the error correction model is to remove as many of these errors from the decompressed frames the baseline video (480p) for display at 720p resolution. This can be done for multiple resolutions. For example the baseline video can be upscaled to a resolution of 1080p, the errors with the master video determined, and this gives a further error correction model to train upon.

While the trainer module 103 can generate one error correction (EC) model for each target resolution of intended playback devices, one model for all target resolutions may be sufficient in an embodiment, since one EC model can be trained for the highest resolution, such as 1080p, and downsampled to the output resolutions as needed. However, one can also train multiple models for targeting computational capabilities of the playback device. That is, the larger these models are, the more accurate they can perform error correction of the input image, at the expense of model size and computational power of the playback device. Therefore, it may be desirable in embodiments to generate a simple EC model for low computational situations such as for older devices and mobile devices on battery power, a moderate EC model for typical playback devices such as tablets and desktop computers, and complex EC model for the most capable devices where image quality is paramount, such as large screen televisions and set-top boxes.

The output from the error correction model trainer 103 is a set of EC models. In the example illustrated in FIG. 1, two EC models are generated labelled 'EC1' and 'EC2'. The video datastore 107 includes a store 105 for the EC model 'EC1', and a store 106 for the EC model 'EC2'. The EC1 model and EC2 model are thus stored along with the "baseline" video in the video datastore 107 for subsequent transferring to the clients. The video datastore 107 is connected to a network.

In an example the baseline video has a resolution 480p, error correction model EC1 is trained to correct errors when upscaled to 720p, and error correction model is trained to correct errors when upscaled to 1080p.

The baseline video compressor 102, the error correction model trainer module 103, and the datastore 107 may all be provided on the server side.

For playing back videos on the client side there is provided a video download module denoted by reference numeral 110. The video download module 110, which is connected to the network, begins by simply transferring the baseline version of the videos from the baseline video store 104 responsive to a user request. Optionally, these videos can be saved into a local datastore denoted as local storage by reference numeral 111 for playback at a later time. The baseline video download module 110 is connected to the local storage 111. Also optionally, if offline viewing is desired, the corresponding error correction models for each video can be downloaded into the local datastore denoted by reference numeral 111 as well from the stores 105 and 106.

When a user initiates a playback of a video, a video player denoted Video Player 1 and by reference numeral 112*a* fetches the baseline video 104, and based on its capabilities and resource constraints, determines which error correction model, if any, is to be used to improve the image quality of the baseline video.

Normally the EC model is determined by the computational capabilities of the playback device and/or the associated display, but it may also be determined by scenarios where the device's computational power is reduced due to battery level or contention for the processing unit.

If an error correction model is favorable, then it is downloaded/transferred to an error correction module 125 associated with the video player 112*a*.

Once the EC model is chosen (if needed) and transferred to the playback device, the video player 112*a* simply passes the decompressed video frames of the baseline video to the EC module 125, and the module then computes the error-corrected images that contain fewer errors, thus improving the image quality. The images as enhanced or corrected by the EC module 125 are then sent to the display for the users watching the video denoted by reference numeral 114.

The EC module 125 thus may include an EC model corresponding to the EC model 'EC1' generated on the server side. The model applied in the module 125 is retrieved via the network from EC1 module 105. The module 125 will retrieve the appropriate model in accordance with the determination of the error model to use.

In a different playback context, when the device is a high-capability playback device such as large screen television sets or set-top boxes with powerful, dedicated processors, a video player denoted Video Player 2 and by reference numeral 112*b* associated with such a display 115 can choose the most complex EC model that could correct the most errors into the highest resolutions, while sharing the same baseline video.

Thus an EC model corresponding to 'EC2' may be retrieved from the server side via the network for the EC module 126 and stored in an error correction module 126 associated with the video player 112*b*.

As demonstrated in the above example, the present invention enables the playback by the video player 112*b* of the same baseline video 104 as with the video player 112*a*, but is able to adapt to the playback environment to maximize the video quality for the end user of display 115 by selecting the appropriate EC model to give a higher quality correction.

As denoted in FIG. 1, the video player 1, 112*a*, is associated with a medium device capability and video player 2, 112*b*, is associated with a high device capability.

It can be understood that in the example of FIG. 1 three resolutions are catered for: a resolution of 480p (with no error correction to the baseline video); a resolution of 720p (with error correction EC1 to the baseline video); and a resolution of 1080p (with error correction EC2 to the baseline video).

In general the video player may query the resolution of the display with which it is associated, or otherwise identify the display's resolution. The video player may then forward this device resolution to the network, and at the network a decision is made as to which (if any) error correction model is best suited for that resolution, and return that error correction model to the video player. Alternatively, if all the error correction models (and their associated resolutions) are stored at the user device, an appropriate decision may be made at the user device.

Therefore does not need to be provided an error correction model for every possible display resolution. The next-largest resolution available can be chosen for a given display resolution as downscaling rarely introduces artefacts.

Figure 2:
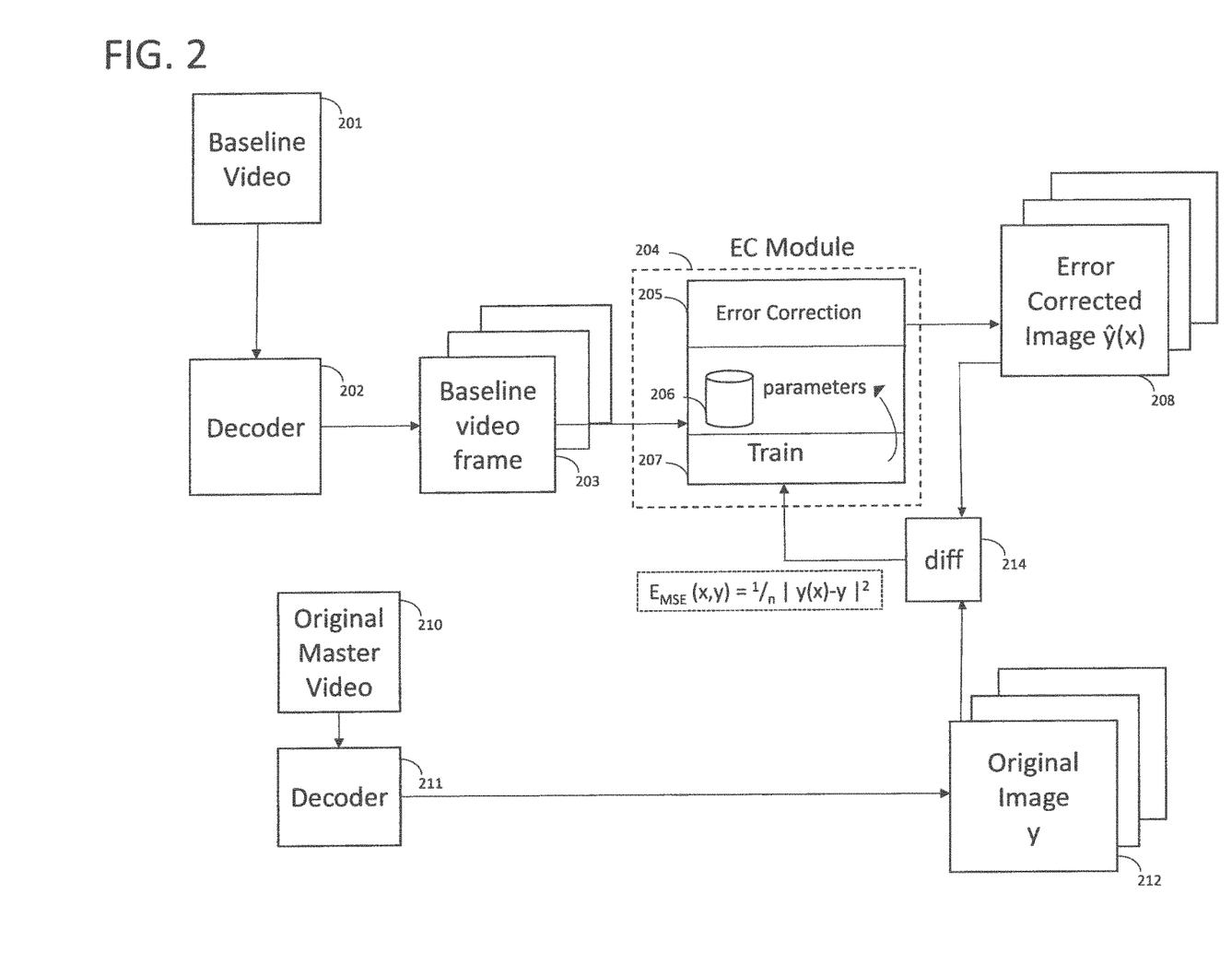
FIG. 2 illustrates in schematic form the manner in which the error correction model is trained to reduce the output images for a given video in accordance with an example according to the invention.

FIG. 2 illustrates in schematic form a manner in which an error correction model may be trained to reduce the output images for a given video in accordance with an example according to the invention and consistent with the operation of FIG. 1.

The training process begins with a baseline video module denoted by reference numeral 201 providing a baseline video to be decompressed by a decoder denoted by reference numeral 202. The decoder 202 decompresses the baseline video into individual image frames, each denoted by reference numeral 203. The individual image frames are usually in a lower resolution than the original "master" video, and contain noise introduced by the compression process. As described above, the baseline video may be a compressed version of the master video for a resolution of 480p.

These baseline images 203 are then fed into an EC module denoted by reference numeral 204. As shown in FIG. 2, the EC module 204 includes an error correction module, a parameters module 206, and a train module 207.

The train module 207 denotes the processor functionality required for the training process to generate error correction models.

An error correction model is generated from the baseline video for a particular target resolution. The error correction module 205 denotes the target resolution for which an error correction model is currently being trained.

The train module 207 adjusts the model's internal parameters in the parameter module 206 used by the error correction module 205 to remove as much of the errors from the baseline image 203 when compared to the original image frame from the "master" video, which is provided in a module denoted by reference numeral 212. The output of the error correction module 205 is an error corrected image $\hat{y}(x)$ denoted by reference numeral 208, which is the image shown to the users once the EC model has been trained and applied. However, prior to the training phase the output images are not the desired ones since the model's parameters are not yet trained.

The training phase is done by first sending the original "master" video from an original master video module denoted by reference numeral 210 through a decoder module denoted by reference numeral 211 to generate the original frame images y in the module denoted by reference numeral 212. These original images serve as the target output for the EC model as applied to the same decompressed frame of the compressed baseline video. The objective of the training phase of the EC model is to adjust the parameters 206 to minimize the pixel differences determined in the difference module denoted by reference numeral 214 between the error corrected image $\hat{y}(x)$ module 208 with original image y in module 212.

It can be understood that in general the baseline video frames are converted into error corrected image frames. The error corrected image frames are compared to the original image frames. Based on this comparison, and the differences identified, the model parameters are adjusted via a chosen learning algorithm to reduce these differences, to generate error corrected images. This is continued to minimise the difference, or ideally until the difference cannot be reduced further, for a given resolution.

Different error correction models may be trained for association with different resolutions The training process repeats for multiple frames of the video, and multiple passes of the video, until the parameter adjustments in module 206 can reduce the errors no further, i.e., until it converges. Once the EC model is trained, its parameters become the EC model for this resolution and it is saved alongside the baseline video to be delivered to the video players 112 for playback. If desired, this process repeats for training multiple EC models per video by varying the resolution of the error corrected image ŷ(x) in module 208 and the number of parameters used within the EC model in module 206.

While which specific training algorithm to use for the EC models is not central to the present invention, there is a class of algorithms based on convolutional neural networks (CNN) that are well suited for the present invention. They have been shown to be very effective at correcting errors within images introduced during the compression process, and are computationally efficient during the error correction phase implemented by module 205. While this training phase is somewhat expensive computationally, this is largely mitigated by offloading the computation to graphic processing units (GPUs). Nevertheless, the specific training algorithm within the EC model is up to the implementer of the system, as long as the algorithm is able to adjust the model's parameters to reduce the pixel differences between its output images and the original ones.

A summary of the generation of an error correction model for a given resolution according to FIG. 2 is as follows:
i) initialize the model parameters in block 206 with values (which may be random or ones from previously trained EC models);
ii) feed an input image decompressed from baseline video (from block 203) into the model;
iii) use the parameters in the model (in block 206) to error correct the input image;
iv) generate an output image to block 208 (which, at first, introduces errors);
v) compute the differences (in block 214) between the output images (block 208) and the original images (block 212);
vi) transmit the differences (from block 214) back into the training functionality of the error correction module 204;
vii) adjust the parameters of the model (block 206) to reduce the errors/differences; and
viii) repeat ii) to vii).

After enough training iterations of the parameters, the EC model gets better at taking the input image and generates the error correction output to be as close as possible to the original image.

This process can be repeated for each desired resolution. Note that as part of the process of FIG. 2, the error correction module 204 may also apply an upscaling for the appropriate resolution.

As discussed in the above, error correction models can be created for different target resolutions, to be applied to a baseline video.

In addition error correction models can be created which can be used for resource restricted playback devices. As noted above, an error correction model comprises a set of parameters. Error correction models can be created which have more or fewer parameters, with more to better correct more errors. Those with fewer parameters can be used by resource-constrained playback devices. For a given resolution, there may be more than one model, each corresponding to a different number of parameters.

Generating an error correction model can be implemented with a number of mechanisms.

In one mechanism, the most common resolution on client devices is chosen as a target resolution for the baseline video. No error correction model will be required for the baseline video, unless the compression of the baseline video introduces sufficient visual artefacts that the implementer can optionally train error correction models to correct these visual artefacts.

In another mechanism, an error correction model is chosen with fewer model parameters, with such an error correction model being used for resource-constrained client devices.

In another mechanism, one highest possible resolution and a model having maximum parameters is chosen as a target for an error correction model which may be used for least resource constrained client devices.

In another mechanism, one or more resolution and model parameter combinations are chosen as target outputs of error correction models, which may be used for a plurality of resource capabilities of client devices.

Training the parameters of error correction models may comprise generating an error-corrected image via an error correction model trained in response to an decompressed image frame from said baseline multimedia stream; computing the pixel differences from said error-corrected image with the original image frame from said input multimedia stream; and adjusting the parameters of said error correction model to reduce said pixel differences.

Generating error-corrected images may further comprise one or more of selecting image frames to generate by favoring ones that generated most pixel differences from said original images; grouping image frames from input multimedia stream via visual similarity and selecting only one frame from each group; and sampling image frames from input multimedia stream by favoring ones with more visual differences within said input multimedia stream.

Computing the pixel differences may further comprise one or more of adjusting weighing of pixel differences based on position of the pixels within the input image; adjusting weighing of pixel differences based on regions of interest of the input image; and adjusting weighing of pixel differences based on multimedia stream data generated during its compression process.

Identifying regions of interest further comprises one or more of identifying objects within input images via image analysis as regions of interest; computing heatmaps within input images via gaze analysis as regions of interest; and estimating high motion regions between input frames as regions of interest.

Determining an error correction model to use may further comprise one or more of determining the resolution of a client device of a user; estimating the maximum bandwidth available on a client device of a user; estimating the computational resources available on a client device of a user; determining the available storage on a client device of a user; and determining the battery level available on a client device of a user.

Correcting errors during playback may further comprise decompressing said baseline multimedia stream into image frames; computing error-corrected output image frames of said image frames via said image correction model; and displaying said error-corrected output image frames to users.

Correcting errors during playback may further comprise one or more of updating the error-correction model in response to large changes in computational resources on a playback device; updating the error-correction model in response to large changes in network bandwidth resources on a playback device; updating the error-correction model in response to large changes of battery level on a playback device; and disabling error-correction model in response to large reductions in resources on a playback device.

The determination of 'large' may be based on a change exceeding a predetermined threshold.

Figure 3:
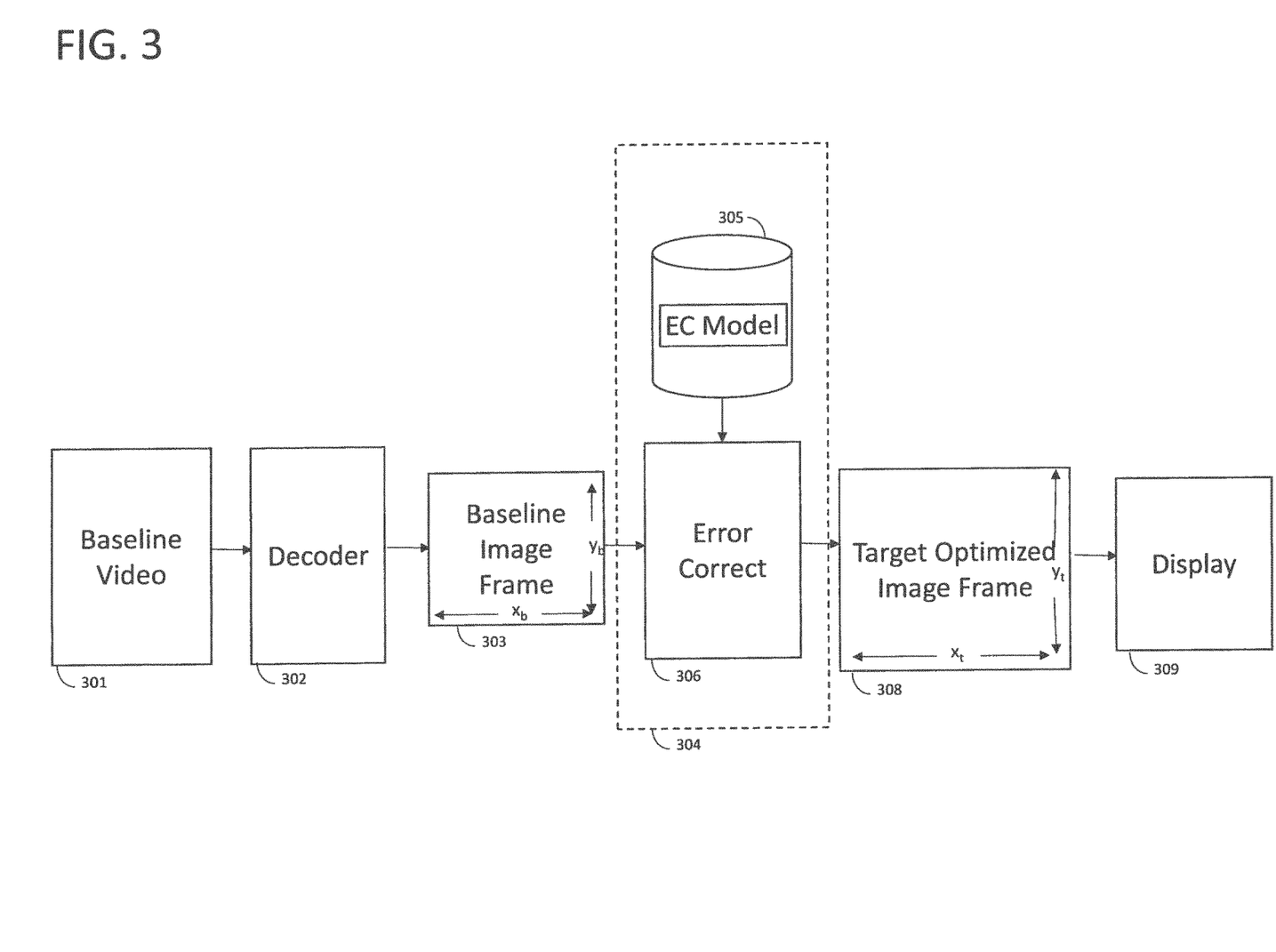
FIG. 3 illustrates in schematic form the manner in which video playback is processed on the client devices in accordance with an example according to the invention.

FIG. 3 illustrates in schematic form the manner in which video playback is processed on a client device in accordance with an example according to the invention. The video player manages the video playback process that begins with the baseline video as the input being retrieved from a baseline video module denoted by reference numeral 301. The baseline video is decoded and decompressed by a decoder denoted by reference numeral 302 into baseline image frames denoted by reference numeral 303.

A modification module 304 including an EC download module 305 and an error correct module 306 receives the baseline image from module 303.

Based on the device's target resolution and computational resources, the video player can optionally download an EC model to the EC download module denoted by reference numeral 305 that best fits the user's playback environment. The model in the module 305 is then used to perform error correction denoted by reference numeral 306 on the baseline image frames 303 to generate target optimised image frames in a module denoted by reference numeral 308. The target image frames are then sent to a display denoted by reference numeral 309 for the users to watch. In applying the EC model to the baseline video, the video player is able to provide the users with the video that has been optimized for image resolution and quality of that device, while minimizing the resources needed to deliver that video experience.

The baseline image frames have a dimension $x_b$, $y_b$ and the target optimized image frame have a dimension $x_t$, $y_t$. The EC model can be chosen to be closest to the dimension $x_t$, $y_t$, and when an exact match does not exist, it is up to the implementer to either choose an EC model that is next-largest than $x_t$, $y_t$ and downsample, or an EC model that is next-smallest and upsample up to $x_t$, $y_t$.

Optionally, in the event that the context of the playback device changes, such as the lowering of computational resources or the users changes the desired resolution of the video, the video player can adapt to the changes by downloading alternate EC models to the module 305 to better match the updated playback environment, or even disable the error correction step all together. This dynamic adaptation and graceful degradation introduced by the present invention not only improves the resource consumption of bandwidth and computational power, but also improves the user experience since the playback would suffer fewer pauses since it can always fallback to the baseline video.

There are a few optional enhancements to this invention that can further improve either the efficiency or the user experience. Since the training phase of the EC models can be computationally expensive, one enhancement is to selectively sample frames from the video for training of parameters of the EC models. For example, one could sample the frames that have the most errors when compared to the original uncompressed frames. Another approach is to analyze the video and group frames based on visual similarity, and sample frames from each group to ensure coverage and reduce redundancy.

Another enhancement is to prioritize the EC models to correct regions that are more important to the viewers, and de-emphasize areas that are less important visually. This enhancement is done at the difference module 214 and is transparent to the training algorithm, since one would only need to update the error function to add a weight to the input image's visual importance per region, such that errors of the differences from important regions are more significant than less important regions. The training algorithm would then adjust the parameters that would provide more accurate error correction to the more important image regions. There are many ways to estimate the visual importance of regions within an image, the simplest being its distance to the center of the image. Another approach is to use motion to estimate the region of interest, which is usually encoded in the video during the compression process. Another approach is to perform object recognition of the images, such as identifying faces and objects, and assign more importance to those regions. One can even generate heatmaps by using gaze analysis to determine these regions of interest for a given video. The benefit of this approach is to either reduce the size of the EC models, since fewer parameters would be needed, or enhance the visual quality further by correcting more errors in the perceptually important regions.

Another enhancement is to train EC models using not only one video, but a collection of them based on some shared visual attributes. The idea is to create models that can be used to error correct multiple videos, which would benefit not only savings in bandwidth and storage, but also can be used to enhance video quality of live videos. That is, it is not a requirement of the present invention that at least one EC model is needed per video, but simply described as the default way to maximize video quality. However, one can take multiple videos, such as day's worth of CNN videos or the past ten episodes of a TV show, and train a single EC model. Not only can these models can then be shared across all of the videos that have been trained on, but also new videos and episodes since they often contain visual similarities. This is particularly useful for live videos as well as for new videos by reusing existing EC models. These aggregate EC models can then be periodically re-trained and redistributed when new videos are added to training set as part of maximizing their error correction accuracy.

The present invention describes an improved method for distributing video content across networks with varying bandwidth capacities, and where there's a plurality of playback devices with varying display and computational capabilities. The present invention maximizes the playback quality that is adaptable to the users' devices, while minimizing the bandwidth and storage resources needed for robust user experience. This is achieved by creating a compressed baseline video targeting a baseline device with limited capabilities, and adaptively enhancing the image quality using error-correction models trained to reduce differences between the baseline video to the original input video. During playback, the video players on client devices can optimize the user experience and available resources by choosing the error correction models that best fit the constraints of each device. The end result is a system for an efficient distribution of videos over networks with high quality playback that adapts automatically to a plurality of devices and playback conditions.

In this description examples are set out in which an error correction model is prepared for generating a target resolution video from a baseline video. The baseline video may have a different resolution. The invention is not limited to the use of an error correction model to meet a resolution target. In general, the error correction model may be used to remove any compression artefacts even if the resolution does not change. For example, the baseline video may be compressed heavily to 720p. Directly decompressing the baseline video would have blurring and blockiness. A suitable error correction model can be applied in the decompression process which has been trained to output a 720p resolution and only to correct these artefacts.

The process of generating a video to view from the baseline video involves decompression. In generating the baseline video the source video is compressed, and therefor in generating a video to view from the baseline video the baseline video is decompressed. This decompression may be referred to as upscaling or downscaling, if the intention is for the video for viewing to have a higher or lower resolution than the baseline video.

Decompressing the baseline video may be with the objective of generating a video for watching having the same or a different resolution than the baseline video, with the error correction applied in the decompressing process to reduce visual artefacts. In such cases an alternate video may be provided as a result of applying an error correction model to meet a particular resolution and visual quality objective. Note the resolution objective may be the same resolution for which the compression was originally carried out, and an error correction model is optionally applied to enhance the visual quality.

Decompressing the baseline video may be with the objective of utilising limited resources available on the device carrying out the decompression, such as reduced bandwidth, reduced memory, reduced processing ability, and reduced battery. In such cases an alternative video may be provided as a result of applying an error correction model which has reduced or lower complexity than an error correction model which would otherwise be used. Conversely, in the cases where additional resources such as more bandwidth, memory or processing ability, an alternative video may be provided as a result of apply an error correction model which has increased or higher complexity than an error correction model which would otherwise be used.

The processes in accordance with the invention may be applied using software. Software may execute appropriate computer program code to implement the described processes. The software may be executed on the server for implementation of processes associated with the server, and on a user device, such as a playback device, for the implementation of processes associated with the playback device.

The invention has been described by way of example with reference to particular arrangements. Aspects of various arrangements may be combined in part or in whole. The invention is not limited to the details of any example given. The scope of the invention is defined by the appended claims.

The invention claimed is:

1. A method of providing multimedia content comprising:
compressing a source video to a baseline video;
generating a first error correction model for a first resolution by:
decompressing the baseline video to the first resolution;
determining errors in the decompressed baseline video at the first resolution level by comparing it to the source video;
determining a plurality of adjustment parameters for correcting the errors to minimise the difference between the decompressed baseline video at the first resolution level and the source video;
generating a second error correction model for a second resolution by:
decompressing the baseline video to the second resolution;
determining errors in the decompressed baseline video at the second resolution by comparing it to the source video;
determining a plurality of second adjustment parameters for correcting the errors to minimise the difference between the decompressed baseline video at the second resolution and the source video; and
applying the first or second error correction models to the baseline video to provide a respective alternative version of the source video at the first or second resolution.

2. The method of claim 1, further comprising:
determining errors in the alternative version of the baseline video, comprising:
applying a correction to the decompressed baseline video;
comparing the corrected baseline video to the source video for differences;
refining the adjustment parameters of the error correction models to reduce the differences; and
iteratively repeating the applying, comparing and refining steps in order to minimise the errors, wherein the error correction models are based on the final iteration.

3. The method of claim 2, wherein comparing the corrected baseline video to the source video further comprises one or more of:
adjusting weighting of differences based on position of pixels within an image;
adjusting weighting of differences based on regions of interest of the source video; and
adjusting weighting of differences based on motion data generated during compressing the source video.

4. The method of claim 3, further comprising:
identifying regions of interest, comprising:
identifying objects within input images via image analysis as the regions of interest;
computing heatmaps within the input images via gaze analysis as the regions of interest; and
estimating high motion regions between input frames as the regions of interest.

5. The method of claim 1, wherein each of the error correction models has a different number of parameters for each of at least one resolution.

6. The method of claim 1, further comprising:
storing each of the baseline video, the first error correction model and the second error correction model.

7. The method of claim 1, further comprising:
receiving a request for an error correction model identifying a characteristic of a playback device, and returning the first or second error correction model most closely associated with the identified characteristic.

8. The method of claim 7 wherein the identified characteristic is one of a resolution characteristic of the playback device and a resource characteristic of the playback device.

9. A method of playing multimedia content, comprising:
retrieving a compressed version of a source video;
determining a resolution for playback of the source video
retrieving an error correction model associated with the compressed version of the source video in dependence on a characteristic of a playback device, wherein the error correction model is associated with the resolution;
decompressing the retrieved compressed version of the source video;
applying the retrieved error correction model to the decompressed version of the compressed version to generate a corrected version of the source video; and
delivering the corrected version to a display.

10. The method of claim 9, wherein the characteristic is a resource characteristic.

11. The method of claim 9 wherein the characteristic is one of a maximum bandwidth available on the playback device, a computational capability of the playback device, available storage on the playback device, and a battery level of the playback device.

12. The method of claim 9 further comprising:
retrieving a further error correction model associated with a different resolution responsive to a change in a resource of the playback device.

13. The method of claim 9, wherein the characteristic is a resolution of a display associated with the playback device.

14. The method of claim 13, further comprising:
determining a resolution of a display associated with the playback device, and retrieving an error correction model being associated with a resolution most closely matching the display resolution.

15. A server, having a memory, the server for providing multimedia content comprising:
a compressor stored in the memory for compressing a source video to a baseline video;
an error correction generator stored in the memory for generating a first error correction model and a second error correction model, the error correction generator comprising:
a decoder stored in the memory for decompressing the baseline video to a first resolution or a second resolution;
a difference module stored in the memory for determining errors in the decompressed baseline video at the first resolution or the second resolution by comparing it to the source video; and
an error correction module stored in the memory for determining a plurality of adjustment parameters for correcting the errors at the first resolution or the second resolution to minimize the difference between the baseline video and the source video for the first resolution; and
a datastore in the memory for storing the baseline video, the first error correction model and the second error correction model, wherein applying each of the first and the second error correction models to the compressed multimedia stream provides a respective alternative first and second versions of the source video.

16. The server of claim 15 wherein to determine errors in the alternative first and second versions of the source video, the error correction generator is further configured to:
apply a correction to the decompressed baseline video;
compare the corrected baseline video to the source video to identify differences;
refine the adjustment parameters of the respective first and second error correction models to reduce the differences; and
iteratively repeat the applying, comparing and refining steps in order to minimise the errors, wherein the first and second error correction models are based on the final iteration.

17. A computer program product for storing a computer program code which, when executed on a computer performs the method of claim 1.

18. A computer program stored on a non-transitory computer readable medium, the computer program for executing the method of claim 1.

* * * * *